Nov. 21, 1961   G. E. FLINN   3,009,369
TRANSMISSION
Filed March 13, 1958   2 Sheets-Sheet 1
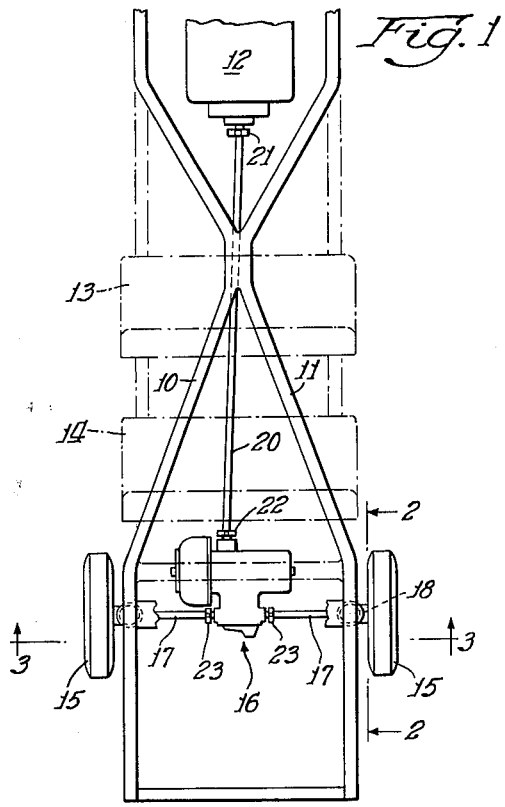
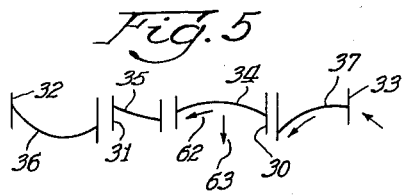
Fig. 6
| | CL.49 | CL.53 | BR.52 | BR.54 |
|---|---|---|---|---|
| FOR'D. | X | | X | |
| REV. | X | X | | X |
| HB (1) | X | X | X | |
| HB (2) | X | | X | X |
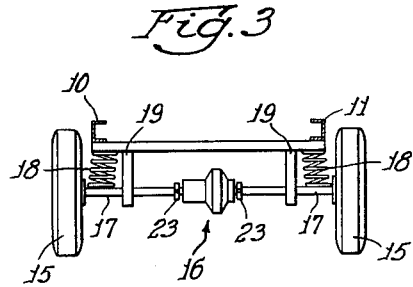
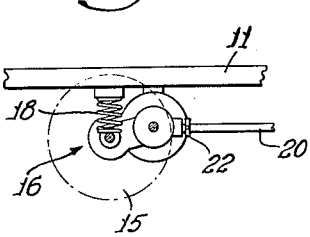
Inventor:
George E. Flinn
By: Keith J. Bleve  atty Nov. 21, 1961

G. E. FLINN 3,009,369

TRANSMISSION

Filed March 13, 1958

Inventor:
George E. Flinn
By: Keith J. Bleuer Atty.

United States Patent Office 3,009,369
Patented Nov. 21, 1961

3,009,369
TRANSMISSION
George E. Flinn, Muncie, Ind., assignor to Borg-Warner Corporation, Chicago, Ill., a corporation of Illinois
Filed Mar. 13, 1958, Ser. No. 721,301
5 Claims. (Cl. 74—732)

My invention relates to automotive vehicles and more particularly to transmissions for such vehicles.

It is an object of the present invention to provide an improved location and disposition of a transmission in an automotive vehicle. More particularly, my invention contemplates that, instead of placing the transmission in its usual location immediately behind the vehicle engine located in the front of the vehicle, the transmission be instead placed in the rear of the vehicle, approximately between the rear driving road wheels of the vehicle. It is also a feature of the invention to locate the transmission in the rear of the vehicle with its longitudinal axis extending transversely of the vehicle.

It is another object of the invention to provide an improved transmission utilizing a hydrodynamic coupling device with a plurality of driven elements or turbines which successively take the drive. It is an object to provide a planetary gear set in such a transmission which is so connected with the plurality of turbines that one of the turbines first provides a low speed drive through the transmission and a second turbine subsequently provides a higher speed drive due to a direct connection to the output member of the transmission.

It is another object of the invention to provide a one-way engaging device in the transmission which releases when the second turbine begins its high speed drive and to provide a clutch in parallel with the one way device to provide a hill braking condition in which the rotation of the input member of the transmission is impeded by the transmission output member.

It is another object of the invention to provide an improved transmission of this type in which the stator or reaction element of the hydraulic torque converter together with the second turbine of the converter both drive reversely simultaneously to provide a reverse drive, with a braking mechanism being provided for the first turbine so that the fluid forces on both the second turbine and the stator are in the reverse direction.

The invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

FIG. 1 is a plan view of the chassis of an automobile in which the torque converter type transmission and differential assembly of the invention is installed;

FIGS. 2 and 3 are sectional views taken on lines 2—2 and 3—3 respectively of FIG. 1;

FIG. 5 is a schematic sectional view of the vanes of the torque converter of the transmission taken on lines 3—3 of FIG. 4; and FIG. 6 is a table showing which of the various clutches and brakes of the transmission are engaged for obtaining various power trains through the transmission.

Like characters of reference designate like parts in the several views.

Figure 4:
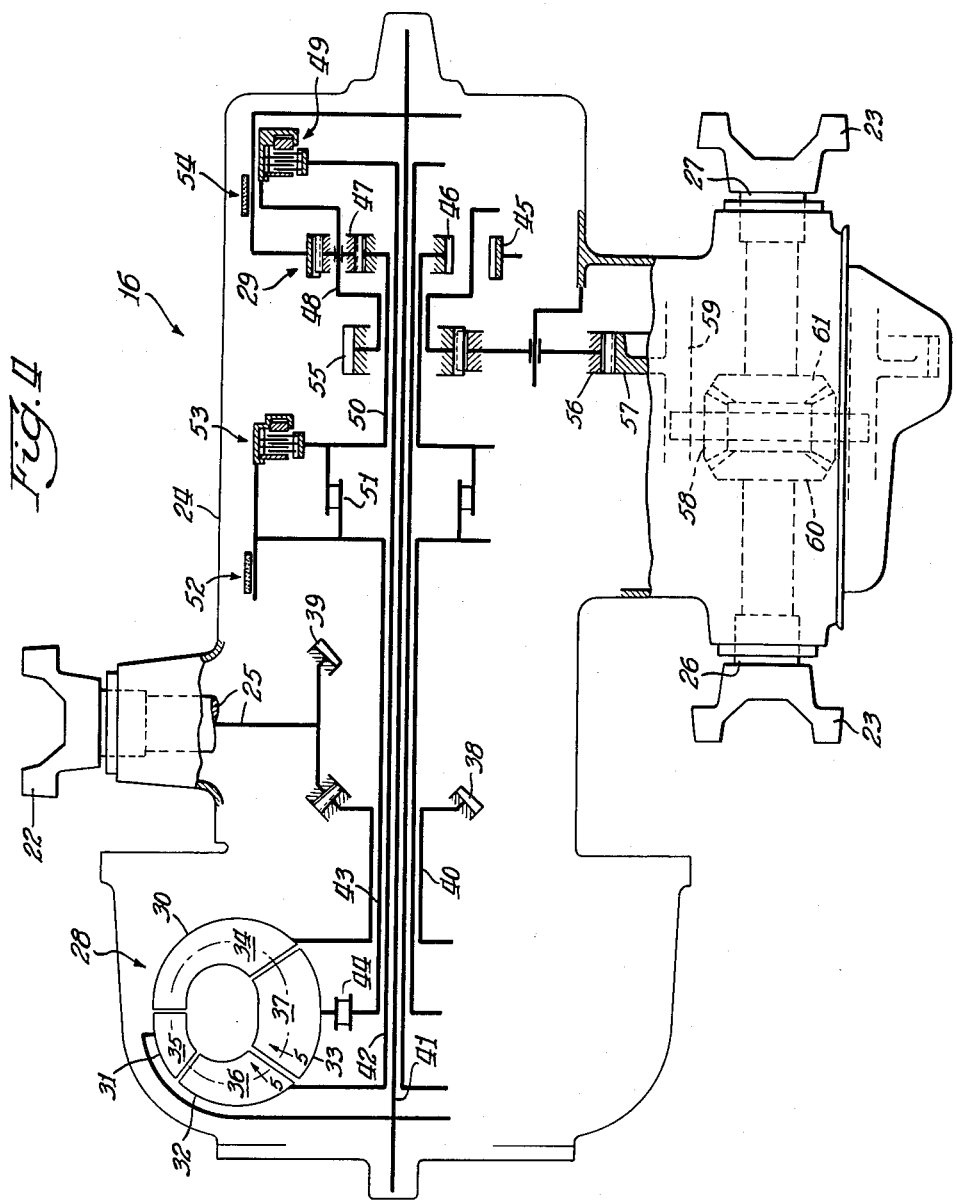
FIG. 4 is a diagrammatic illustration of the transmission-differential assembly.

Referring now to FIG. 1, the automobile chassis illustrated therein may be seen to comprise side frame members 10 and 11 which are joined intermediate their lengths to form an X-type of vehicle frame. The conventional automobile engine 12 is mounted adjacent the front end of the chassis, and the usual passenger seats 13 and 14 are fixed with respect to the chassis in the conventional manner.

Rear driving road wheels 15 are disposed adjacent the rear end of the chassis, and a transmission-differential assembly 16 is mounted with respect to the chassis between the road wheels 15. Each of the road wheels 15 is rotatably carried by a swing axle 17, and a coil spring 18 is disposed between each of the axles 17 and a portion of the vehicle chassis so as to swingingly mount the wheels chassis with respect to the chassis. A limit strap 19 extends around each of the axles 17 and is fixed to the chassis adjacent the upper end of the adjoining spring 18 for holding the axle 17 against any other than vertical movement in the strap 19. A propeller shaft 20 drivingly connects the engine 12 and the assembly 16, and universal joints 21 and 22 respectively connect the shaft 20 with the engine 12 and the assembly 16. Each of the swing axles 17 is connected by means of a universal joint 23 with the assembly 16 for driving the road wheels 15 carried by the axle but yet allowing vertical movement of the road wheels with respect to the vehicle chassis.

The assembly 16 comprises a casing 24. An input shaft 25 is journaled in the casing at one side thereof, and a pair of output shafts 26 and 27 are journaled in the casing 24 substantially opposite the shaft 25. The shaft 25 is connected by means of the universal joint 22 to the propeller shaft 20, and each of the shafts 26 and 27 is connected by means of one of the universal joints 23 to the corresponding swing shaft 17.

The transmission comprises, in general, a hydraulic torque converter 28 and a planetary gear set 29. The torque converter 28 is provided with a pump or impeller element 30, a first turbine or driven element 31, a second turbine or driven element 32, and a stator or reaction element 33. The elements 30, 31, 32 and 33 are respectively provided with blades 34, 35, 36 and 37.

The impeller 30 is drivingly connected with the shaft 25 by means of a pair of meshed bevel gears 38 and 39. The gear 39 is fixed on the shaft 25, and the gear 38 is fixed with respect to a sleeve shaft 40 to which the impeller 30 is attached. The turbines 31 and 32 are respectively fixed with respect to shafts 41 and 42. The stator 33 is mounted on a shaft 43, and a one-way engaging device 44 is disposed between the shaft 43 and the stator 33. The one-way engaging device 44 may be of any conventional construction and is arranged to engage for a force on the stator 33 in the reverse direction, that is, in the direction of rotation opposite to that of the impeller 30.

The planetary gear set 29 comprises a ring gear 45, a sun gear 46, a plurality of planet gears 47 in mesh with the sun and ring gears, and a planet gear carrier 48. The ring gear 45 is fixed with respect to the shaft 41, and the carrier 48 is connectible to the shaft 42 by means of a friction clutch 49 effectively disposed between the carrier 48 and the shaft 42. The sun gear 46 is mounted on a shaft 50 which is connected by means of a one-way engaging device 51 with the shaft 43. The one-way engaging device 51 is of conventional construction and is arranged to hold the shaft 50 and the sun gear 46 from rotation in the reverse direction (opposite from the direction of rotation of the impeller 30) when the shaft 43 is stationary.

A friction brake 52 of any suitable construction is provided for the shaft 43; and a friction clutch 53, also of any suitable construction, is provided in parallel with the one-way engaging device 51. A friction brake 54 of conventional construction is provided for the ring gear 45.

An output gear 55 is fixed on the carrier 48 and meshes with a countershaft gear 56 which in turn meshes with a ring gear 57 forming a part of the differential for driving the shafts 26 and 27. The differential is of conventional construction and comprises bevel gears 58 rotatably mounted on a carrier 59 therefor on which the ring gear 57 is fixed. A pair of bevel gears 60 and 61 are fixed on the shafts 26 and 27 respectively and mesh with the bevel gears 58 carried by the carrier 59.

In operation, the engine 12 drives the transmission and differential assembly 16 through the propeller shaft 20 and universal joints 21 and 22. The assembly 16 drives the road wheels 15 through the swing axles 17, and due to the presence of the universal joints 23, the swing axles 17 may move vertically within the straps 19 against the action of the suspension springs 18 when the vehicle travels on rough or other uneven places in the road.

The shaft 25 constitutes the input shaft of the assembly 16 and is driven through the universal joint 22. The shaft 25 drives the impeller 30 through the bevel gears 38 and 39 and the sleeve shaft 40. The torque converter 28, as is usual with such devices, includes a fluid housing, and the blades 34, 35, 36 and 37 are completely immersed within the fluid. The impeller blades 34, when the impeller 30 is thus driven, cause fluid motion as indicated by the arrows 62 in FIGS. 4 and 5, the direction of rotation of the impeller 30 being indicated by the arrow 63 in FIG. 5. The fluid moves toroidally between the blades of the first turbine 31, the second turbine 32, and the stator 33 back into the impeller 30 in succession. As will be observed from FIG. 5, the stator blades 37 discharge fluid to the impeller 30 in the same direction as the impeller is rotated, as indicated by the arrow 63. The impeller blades 34 also are directed to discharge fluid in the same direction as the impeller rotates. The blades 35 and 36 of the turbines 31 and 32 are directed to discharge fluid in the opposite direction, at least when the turbines 31 and 32 are stationary.

For forward drive, the brake 52 and the clutch 49 are engaged. The brake 52 functioning on the sleeve shaft 43 holds the stator 33 against reverse rotation, and the reaction force on the stator 33 is taken through the one way engaging device 44 which engages under these conditions. The stator 33 tends to rotate in the reverse direction, that is, in the direction of rotation opposite to that of the impeller 30, due to the shape of the stator blades 37. The brake 52 is also effective on the sun gear 46 of the planetary gear set 29, the one way engaging device 51 in this case functioning to engage, so that the brake 52 can take reaction force in the reverse direction on the sun gear 46.

When the fluid is thus driven toroidally in the torque converter 28, initially the small first turbine 31 drives. The turbine 31 is connected to the ring gear 45, through shaft 41 and tends to rotate the sun gear 46 in the reverse direction, but this rotation of the sun gear 46 is prevented due to the one-way engaging device 51 and the brake 52; and the carrier 48 and output gear 55 are thus driven forwardly at a speed reduction due to functioning of the gear set 29. Under these conditions, both the hydraulic torque converter 28 and the gear set 29 function to multiply torque, and the drive as just described of the gear 55 is one in which the speed of the gear 55 gradually increases, while the torque conversion by the hydraulic torque converter 28 gradually decreases.

The torque applied to the gear 55 is transferred to the shafts 26 and 27 and the swing shafts 17 and road wheels 15 through the gears 56 and 57 and through the bevel gears 58, 60 and 61 constituting the conventional differential. The road wheels 15 thus have torque applied to them for starting the vehicle from rest and driving it at a relatively low speed.

It will be noted that the second turbine 32 is connected directly through the shaft 42 with the carrier 48 and gear 55; however, initially the second turbine 32 does not have sufficient torque applied to it by the fluid in the torque converter 28 to solely carry the drive. As the speed of the vehicle increases, however, the fluid flowing in the converter 28 between the blades 36 of the second turbine eventually apply a sufficient torque to the turbine 32 so that the second turbine drives the load by itself, without help from the first turbine 31. As soon as the second turbine 32 transmits sufficient power to drive the vehicle, at this time the sun gear 46 begins to rotate in the forward direction, and the one way engaging device 51 over-runs and allows this rotation of the sun gear 46. The small turbine 31 for subsequent driving at increased road speeds then has no further effect, and the entire torque for driving the vehicle is transmitted by the second turbine 32. The driving by the second turbine 32 is also one in which the speed of the gear 55 and thereby of the road wheels 15 gradually increases with respect to the speed of the input shaft 25 and in which the torque multiplication through the torque converter 28 gradually decreases. Eventually the torque conversion in the converter 28 decreases to a point such that the reaction on the stator 33 reverses, and at this time, the stator 33 begins to rotate in a forward direction and the one-way brake 44 for the stator releases. Subsequent drive through the hydrodynamic unit 28 is similar to that of a two element fluid coupling, and no torque conversion takes place in the torque converter 28.

Reverse operation of the transmission is obtained by engaging the brake 54, the clutch 53, and the clutch 49. For this drive, the brake 52 is released. The brake 54 acts on the small turbine 31 through the shaft 41, and the turbine 31 under these conditions directs the toroidally moving fluid in the converter 28 in the reverse direction against the blades 36 of the large turbine. The larger turbine 32 is connected directly through the shaft 42 and the clutch 49 with the carrier 48, and the large turbine 32 thus drives directly through the output gear 55. Simultaneously, the toroidally moving fluid in the converter 28 applies a force in the reverse direction on the blades of the stator 33, similarly as for low speeds in forward drive, and the reverse torque on the stator 33 is transmitted through the one-way device 44, the shaft 43, the clutch 53 and the shaft 50 to the sun gear 46. The sun gear causes the gears 47 to planetate within the ring gear 45, and the stator 33 thus also applies a reverse driving torque on the carrier 48 and the gear 55. The gear 55, as in forward drive, causes the road wheels 15 to be driven in a direction and with a torque corresponding to the gear 55. Under stall conditions, that is, when the vehicle is just starting to move in the reverse direction, the stator 33 receives its maximum force in the reverse direction, and this is, of course, multiplied through the planetary set 29 as just described by the reaction against the ring gear 45 to provide an extra torque output in addition to that provided by the large turbine 32.

In order to put the transmission in neutral condition, all of the clutches 53 and 49 and the brakes 52 and 54 are released.

For normal engine braking as used in flat country operation, the large turbine 32 driving directly to the output gear 55 through the shaft 42 and carrier 48 gives a satisfactory amount of retardation to the vehicle, corresponding to direct drive in a conventional hand shifted automotive transmission. For engine braking when traveling in hills, the clutches 49 and 53 and the brake 52 may be engaged. During downhill operation, the output gear 55 drives the large turbine 32 directly through the clutch 49, and the planetary gearing 29 causes the small turbine 31 to be driven at an overdrive ratio, since the sun gear 46 is held stationary through the clutch 53 and the brake 52. The large turbine 32 rotating at the same speed as the output gear 55 and the small turbine 31 operating at an overdrive with respect to the output gear 55 cause turbulence in the fluid in the torque converter 28 and coact on and brake each other through the fluid to provide a braking effect on the output gear 55.

A dynamic type of hill braking may be obtained by engaging the clutch 49 and the brakes 52 and 54. The brake 54 holds the small turbine 31 stationary through the shaft 41 and also holds the ring gear 45 of the planetary set 29. The large turbine 32 tends to be driven backwardly by the action of the impeller 30 forcing converter fluid through the stationary small turbine 31. This backward rotation of the large turbine 32 is transmitted directly to the output gear 55 through the shaft 42 and the clutch 49. Under these conditions, there is no reaction from the sun gear 46 of the planetary set 29 because of the one-way engaging device 51 which disengages under these conditions. When the throttle of the engine 12 is closed, some degree of engine braking is obtained; however, if the engine throttle is opened, more braking occurs, until at wide open throttle a maximum of engine braking is obtained by the converter fluid tending to force the large turbine 32 backwardly against the forward rotation imparted to the output gear 55 from the vehicle.

Inasmuch as the transmission-differential assembly 16 is located in the rear of the vehicle and spaced from the engine 12, the usual large transmission hump in the floor of the front passenger compartment ahead of the seat 13 is not necessary. The transmission assembly 16 is furthermore located out of the way of the rear seat 14, since the transmission is placed transversely of the vehicle chassis with the shafts 41, 42 and 50 extending across or transversely of the chassis.

My improved transmission advantageously provides an initial low speed drive by virtue of the forward torque applied by the fluid in the converter 28 on the first turbine 31, and the torque transmitted by the turbine 31 is multiplied by the gear set 29. The second turbine 32 which is directly connected with the output member 55 of the transmission subsequently takes up the drive with a release of the one-way engaging device 51. A reverse drive is advantageously provided by braking the first turbine 31 so that the second turbine 32 in addition to the stator 33 provides a driving torque in the reverse direction.

Hill braking is advantageously provided by engaging the clutch 53 in parallel with the one-way device 51, so that in effect the transmission remains in its low speed drive without changing to its higher speed drive. A dynamic type of hill braking action is provided by virtue of engagement of both of the brakes 52 and 54. In this case, the large turbine 32 has reverse torque on it by virtue of the action of the impeller 30 forcing fluid through the stationary small turbine 31, the backward torque on the large turbine 32 being transmitted directly to the output member 55.

I wish it to be understood that my invention is not to be limited to the specific constructions and arrangements shown and described except only insofar as the claims may be so limited, as it will be understood to those skilled in the art that changes may be made without departing from the principles of the invention.

I claim:
1. In a transmission, the combination of an input member, an output member, a hydrodynamic torque converter comprising an impeller driven from said input member and a stator or reaction element and first and second turbine or driven elements, a planetary gear set comprising a plurality of drivingly interconnected elements a first one of which is connected to said output member, means for connecting said second turbine element to said first gear set element and thereby to said output member, means for connecting said first turbine element to a second one of said gear set elements, a friction brake, and one-way braking mechanism rendered effective by said friction brake for the third of said gear set elements and for said stator element for completing an initial drive through said converter and said gear set to said output member.

2. In a transmission, the combination of an input member, an output member, a hydraulic torque converter comprising an impeller driven from said input member and a stator or reaction element and first and second turbine or driven elements, a planetary gear set comprising a sun gear and a ring gear and a planet gear in mesh with said sun and ring gears and a planet gear carrier, said carrier being connected to said driven member, a clutch for connecting said second turbine element with said carrier and said output member, means drivingly connecting said first turbine element and said ring gear, a one-way engaging device connected with said sun gear, a one-way engaging device connected with said stator element, and a friction brake connected with said one-way devices for braking said stator element and sun gear for completing a drive between said members.

3. In a transmission, the combination of an input member, an output member, a hydraulic torque converter comprising an impeller driven from said input member and a stator or reaction element and first and second turbine or driven elements, a planetary gear set comprising a sun gear and a ring gear and a planet gear in mesh with said sun and ring gears and a planet gear carrier, said carrier being connected to said output member, a friction brake, a one-way engaging device connected between said friction brake and said stator element for holding the latter against reverse rotation, a one-way brake between said friction brake and said sun gear for holding said sun gear against reverse rotation, means drivingly connecting said first turbine element and said ring gear for driving said output member at an initial low speed with engagement of said friction brake and said one-way devices, means drivingly connecting said second turbine element to said carrier and output member to subsequently drive said output member at a higher speed with disengagement of said one-way devices, and a brake for said ring gear and said first turbine element for causing said second turbine element to tend to rotate in the reverse direction when said first turbine is so braked and when said friction brake is applied for providing a braking condition on said output member.

4. In a transmission, the combination of an input member, an output member, a hydraulic torque converter comprising an impeller driven from said input member and a stator or reaction element and first and second turbine or driven elements, said elements having toroidally disposed blades with the fluid output of said pump discharging successively into said first turbine and said second turbine and said stator element, the said blades on said pump and said stator being disposed to discharge fluid in the direction of rotation of said pump and the blades of said two turbine elements being disposed to discharge fluid in the opposite direction, a planetary gear set comprising three drivingly interconnected elements a first one of which is connected to said output member, means for drivingly connecting said second turbine element to said first planetary set element and to said output member, means for drivingly connecting said first turbine element to a second one of said planetary set elements, and one-way engaging braking mechanism for said stator element and for the third one of said planetary set elements for providing a drive between said members.

5. In a transmission, the combination of an input member, an output member, a hydraulic torque converter comprising an impeller driven from said input member and a stator or reaction element and first and second turbine or driven elements, said elements having toroidally disposed blades with the fluid output of said pump discharging successively into said first turbine and said second turbine and said stator element, the said blades on said pump and said stator being disposed to discharge fluid in the direction of rotation of said pump and the blades of said two turbine elements being disposed to discharge fluid in the opposite direction, a planetary gear set comprising a sun gear and a ring gear and a planet gear in mesh with said sun and ring gears and a planet gear carrier, said carrier being connected to said driven member, means for drivingly connecting said first turbine element with said ring gear, means for drivingly connecting said second turbine element with said carrier and with said output member, a one-way engaging device disposed between a shaft and said stator, a friction brake for said shaft so that said one-way engaging device functions to hold said stator against reverse rotation, a one-way engaging device between said friction brake and said sun gear for holding said sun gear against reverse rotation for providing an initial low speed forward drive from said input member to said output member, a clutch for bridging said second named one-way device for providing a two-way drive between said shaft and said sun gear, and a brake for said ring gear and said first turbine element for providing a reverse drive from said input member to said output member when said clutch is also engaged.

References Cited in the file of this patent

UNITED STATES PATENTS

| | | |
|---|---|---|
| 2,448,345 | Aronson | Aug. 31, 1948 |
| 2,596,931 | Kelley | May 13, 1952 |
| 2,625,056 | Kelley | Jan. 13, 1953 |
| 2,645,299 | Vincent | July 14, 1953 |